June 23, 1970      R. E. HARTMAN      3,516,895

AIRCRAFT SKIN LAMINATES

Filed Feb. 3, 1964

INVENTOR.
RICHARD E. HARTMAN
BY John D. Haney
ATTY.

United States Patent Office 3,516,895
Patented June 23, 1970

3,516,895
AIRCRAFT SKIN LAMINATES
Richard E. Hartman, Akron, Ohio, assignor to The B. F. Goodrich Company, New York, N.Y., a corporation of New York
Filed Feb. 3, 1964, Ser. No. 341,940
Int. Cl. B32b 3/12
U.S. Cl. 161—68                                    2 Claims

ABSTRACT OF THE DISCLOSURE

This disclosure relates to the manufacture of rigid lightweight honeycomb laminates with slotted external surfaces which are useful as airfoil skins for aircraft. The disclosure includes both a new slotted laminate structure and a method of making the new laminate.

---

Slotted airfoils function to minimize aerodynamic drag on an aircraft resulting from the thin boundary layer of turbulent air which accumulates along an airfoil surface in flight. In a slotted airfoil, a multitude of holes, usually in the shape of long narrow slots extending transverse to the airflow, are provided in the skin of the airfoil throughout the regions on which a boundary layer of turbulent air is expected to exist. During flight, the boundary layer of air is eliminated by pumping it through these slots and holes and through suitable ductwork inside the airfoil to a remote discharge site. Accordingly, the friction drag of the airflow on the airfoil is materially reduced.

The theory of slotted airfoils and prior art techniques of making such airfoils with aircraft quality metallic honeycomb laminates are discussed by Henry F. Click in "Multiple Bonding for the X–21" published in Adhesives Age, May 1963, p. 22 et seq. According to this reference the external or airflow-exposed side of these laminates has been formed with multi-layered thin plates adhesively bonded one to another and through all of which the slots are machined. On the opposite or honeycomb-engaging side of these skin plates, the slots have been communicated with shallow grooves either formed directly into the plate, or formed in a thick thermosetting adhesive layer between these plates and the honeycomb. These grooves in turn have communicated with duct holes cut through the honeycomb and through the opposite or inside skin plate of the laminate. On the external side of the inside plate, plastic manifolds have been bonded to connect all the duct holes to a discharge system. The construction of these laminates is such that multi-stage adhesive curing operations are required. Moreover, it has been necessary to perform certain of the slot-cutting and hole-drilling operations in the laminate between successive curing operations. Also the external manifolds are vulnerable to being damaged.

The present invention provides a slotted honeycomb laminate which is both structurally stronger and much less expensive to manufacture than those suggested in the prior art. The improved rigidity is obtained notwithstanding the presence of a multitude of slots in the external skin plate of the laminate. Moreover, the principal metal cutting and forming steps may be completed independently of the adhesive curing. And only a single stage adhesive cure is required in the new method, thereby minimizing the possibility of overcuring the adhesive. The opposing sides of the laminate are free of any irregular contours or bulges like the external manifolds.

These advantages are accomplished by incorporating rigid duct-manifold channels directly inside the honeycomb laminate and as an integral part of the slotted external skin plate. These channels not only function as manifolds for the slots, but also tend to increase the bending resistance of the laminate to offset the weakening effects of the slots. Still another advantage of this construction is that it affords the airfoil designer much greater latitude in planning the shape and disposition of the slots in the skin because this can be done without materially affecting the cost of the structure.

The invention and other advantages of it will be further described with reference to the accompanying drawings which show, by way of example, certain preferred slotted honeycomb laminates made according to this invention. In the drawing.

Figure 1:
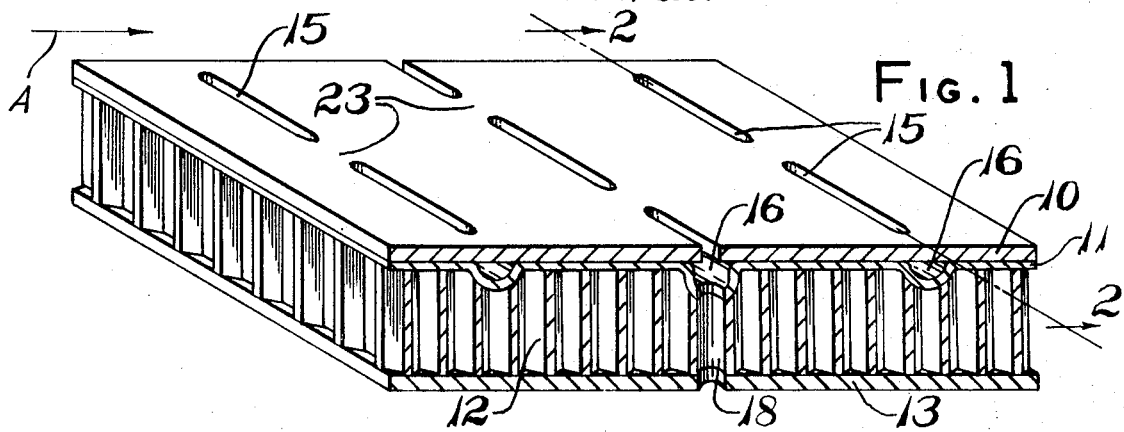
FIG. 1 is a perspective view of one laminate and also showing the cross section of the laminate.

Referring to FIG. 1, the laminate of this invention includes a slotted external skin plate 10, a channel plate 11, a honeycomb section 12 and a bottom or inside skin plate 13 superimposed one upon the other in the order mentioned. These components are adhesively bonded one to the other by suitable adhesives which are well known in the art for making aircraft skin laminates of this class. All of these components are metal. Preferably they are aircraft-quality almuinum. For the purpose of this invention, however, any suitable metal may be used such as stainless steel, titanium, etc. Inasmuch as the invention is directed to the structural features of the laminate and to the procedure for making it, the character of the particular materials of the laminate is not critical, and in appropriate cases the laminate could be made with non-metallic materials or combination of metallic and non-metallic materials of adequate rigidity.

The external skin plate 10 of this laminate provides the slotted external surface of an airfoil and is therefore formed with a series of long narrow slotted holes 15 which go completely through the top plate 10. The slots are longitudinally offset one from another in successive rows to avoid unduly weakening the top plate. The slots extend transversely to the direction of the airflow across the airfoil surface which in FIG. 1 is represented by the large arrow A.

The channel plate 11 is very much thinner than the skin plate 10 and includes a series of channels 16 which directly underlie the slots 15. The regions of the channel plate 11 between the channels 16 fit flush against and are adhered to the lower side of the skin plate 10.

The honeycomb 12 is preferably metallic aluminum honeycomb made in the conventional manner. The side of the honeycomb which mates with the convex sides of the channels 16 is routed out appropriately so that the convex side of each channel 16 in plate 11 fits snugly against the honeycomb.

The bottom skin plate 13 is adhesively bonded to the opposite side of the honeycomb and may be approximately the same thickness as the skin plate 10.

Figure 3:
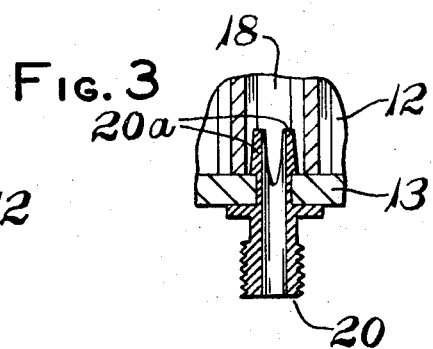
FIG. 3 is a detail view showing in cross section a connector of preferred design for the inside skin plate of the laminate.

A series of holes 18 extend vertically through the honeycomb from the channels 16 in channel plate 11 and also through the bottom skin plate 13. The mouths of the holes 18 in skin plate 13, as shown in FIG. 3, are adapted to receive small connectors 20 which may be snap fitted into these holes 18 from the lower or outside surface of skin plate 13. The connector 20 shown in FIG. 3 includes resilient prongs 20a which expand after they are pushed through the holes in plate 13 to lock the fitting in place. A suitable sealant (not shown) may be used to seal this fitting around the hole in bottom plate 13. Ordinarily the connectors 20 will be integrally fastened to suitable hoses (not shown) or other conduits from the pump system (not shown) and are installed after the airfoil structure is fully fabricated.

Figure 2:
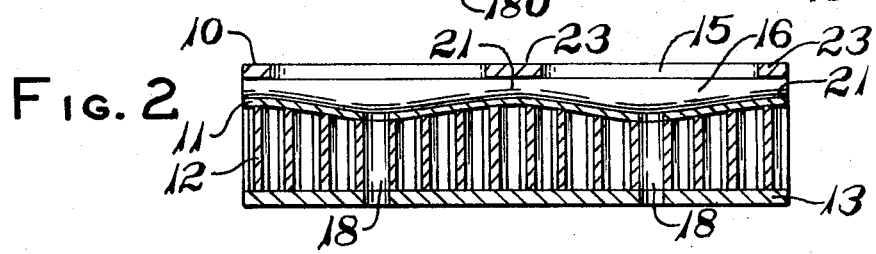
FIG. 2 is a sectional view taken along the line 2—2 of FIG. 1.

The channels 16 may be of uniform depth relative to the skin plate 10 but preferably the channels taper in depth from a rather shallow portion 21 (see FIG. 2) under a solid region 23 of plate 10 between adjoining slots 15, to a deeper region at the upper mouth of hole 18 in the channel intermediate the ends of the slots 15. The purpose of the holes 18 is to communicate the channels 16 with the suction side of a suitable discharge pump system (not shown) which is to be connected by suitable hoses mentioned in the preceding paragraph to the fittings 20. Such a pump system operates to draw air from the external surface of the upper skin plate 10 through the slots 15, and into the channels 16, and then through the holes 18. This air is then exhausted through fittings 20 to the discharge side of the pump system.

The channels 16 thus operate as manifolds interconnecting the slots 15 of each row of slots. Ordinarily, the channels 16 are disposed in the lengthwise direction of the slots and extend along the entire length of a row of slots 15. If desired, as explained in the manufacture of this laminate, additional transverse slots (not shown) may be provided to communicate one row of slots 15 of the next succeeding row of slots 15.

Figure 5:
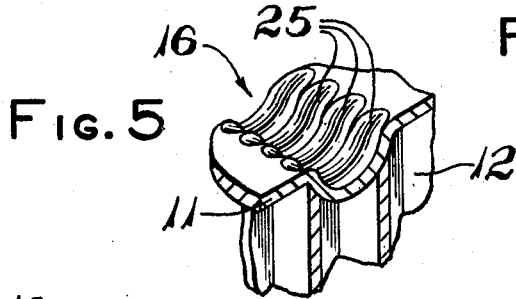
FIG. 5 is a fragmentary detail view showing corrugated channels as an optional feature of the invention.

Owing to the fact that the channels 16 are in tight engagement with the underlying side of the honeycomb 12, the channel plate 11 will operate to structurally stiffen the laminate against flexure in a direction transverse to the rows of slots 15 in addition to its manifolding function. If desired, to stiffen the laminate against flexure in a direction lengthwise of the slots 15, the channels 16 may be made with corrugations 25 extending transverse to the length of the channels as shown in FIG. 5.

Although the channels 16 in the example shown have a U-shaped cross section, these channels can be made with a more generally V-shaped section to further stiffen the laminate. The channels may be made of any cross section desired within the scope of this invention.

In the manufacture of this laminate the slots 15 are cut into the top plate 10 and the channel plate 11 is formed with the channels 16 before any adhesive is applied to these parts.

The slots 15 may be cut through the top plate 10 by any conventional machining technique, but we prefer to cut them with the recently developed cutting techniques involving the use of lasers which provide unusually clean, burr-free edges. If saw techniques are used, the sawing is controlled so that the end walls of the slots are cut cleanly and perpendicular to both the upper and lower surfaces of the external skin plate 10 but in any event the ends of the slots should be rounded. Square corners are undesirable because of their tendency to concentrate stresses.

The channel plate 11 is most conveniently and inexpensively made by stamping the channels 16 into a flat metal plate. By stamping or drawing operations well known in the art, the channels 16 may be made with the desired tapering depth and configuration such that the channels 16 will register properly with the slots 15 when assembled with the top plate. During this stamping operation the holes 18 also may be punched in the deepest part of the channels 16, which holes will eventually form the mouth of the duct holes 18 through the honeycomb. Alternatively the channel plate 11 may be shaped by rolling operations.

The upper edge region of the honeycomb which mates with the channel plate 11 may be routed out by conventional machining techniques in a grooved pattern corresponding to the pattern of the grooves in the channel plate 11.

After the foregoing forming operations have been completed, the channel plate 11 may be temporarily assembled with the honeycomb 12 and with the bottom plate 13, and then the remaining portions of the holes 18 are drilled through the honeycomb 12 and through the plate 13, using the previously punched holes in the channels 16 as a template or drilling guide. If the drilling operation is completed in this manner, the concave sides of the channels 16 will be burr-free and the holes 18 will be clean and smooth. If desired, the mouths of the holes on the external face of the bottom skin plate 13 may be deburred, but ordinarily this will not be necessary because of the sealing material preferably used around the fittings 20. By designing drilling jigs with sufficient accuracy, the holes 18 in the honeycomb and the bottom skin plate 13 may be made without the necessity of an assembly with the channel plate 11.

After the foregoing machining operations are completed, the parts of the laminate are cleaned so that they are completely free of chips and other foreign materials. They are also degreased if necessary in preparation for the reception of the adhesives.

Next, the matching surfaces of the laminae are covered with an appropriate adhesive in either liquid or sheet form and the laminate is assembled as shown in FIG. 1 and placed in a suitable curing press (not shown) to press the laminate together and to cure the adhesive under sufficient heat and pressure to whatever extent is required by the chemical properties of the adhesive. In the curing operation the laminate may be also curved as necessary to provide the particular contour desired for the airfoil.

None of the cutting or machining operations are very critical or require unusually close tolerance manufacture as has been required with the slotted laminates made according to the prior art. Moreover, only a single curing stage is required.

Inasmuch as the channels 16 may be made considerably wider than the slots 15, the laminate may be deformed to various curved configurations without displacing the slots 15 out of register with channels 16.

The construction and method of assembly provided by this invention is so simple that it is possible for the slots 15 to be cut in various patterns other than straight rows if this is desired to improve the aerodynamic effects of the slots. As suggested in FIG. 4 the slots 150 may be zigzagged, and in this case the channel 160 underlying such slots may also zigzag with the same pattern, or it may be simply a straight channel if the amplitude of the zigzag pattern permits. The embodiment of FIG. 4 in other respects includes skin plates 100 and 130, a channel plate 110, and a honeycomb section 120 with holes 180 corresponding to those portions of the FIG. 1 embodiment.

Figure 6:
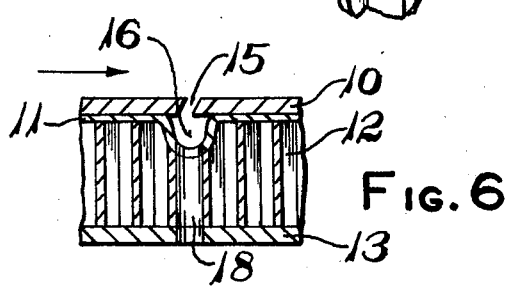
FIG. 6 is a partial sectional view showing still other optional details of the laminate.

Referring to FIG. 6, it is possible with this technique to slant the sides of the slots 15 away from the vertical between the opposing surfaces of the top skin plate 10. Features such as these may be easily provided with no cost disadvantage to the manufacturer.

Figure 4:
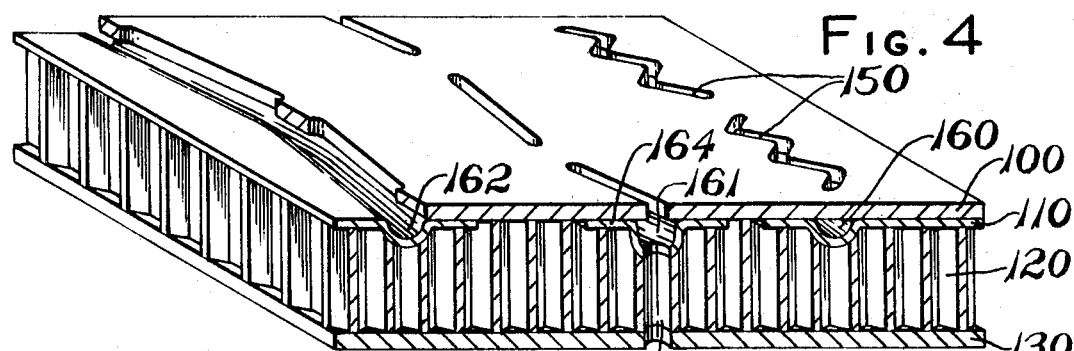
FIG. 4 is a partial perspective view like FIG. 1 but showing zigzag-shaped slots in the external skin plate of the laminate.

In forming the channel plate 11, it is possible to eliminate the web regions between the adjoining channels as indicated in FIG. 4 at channels 161 and 162. That is to say these channels in FIG. 4 may be separately formed so that they are disconnected from each other. Each such separate channel will have a pair of flanges 164 for attaching the channel to the slotted skin plate and the honeycomb will be routed to receive such flanges as well as the channel portions. The term "channel plate" as used herein includes a discontinuous channel plate as in FIG. 4, as well as a continuous one as in FIG. 1.

Other variations are possible within the scope of the appended claims.

I claim:

1. An aircraft skin laminate having a honeycomb core sandwiched between and adhesively bonded to opposing skin plates, one of which plates has a multitude of slots communicating with duct holes through the interior of the honeycomb core and through the opposing plate through which air above the slotted plate may be pumped through said slots and duct holes, and a thin rigid channel plate having a plurality of channels therein is interposed between and adhesively bonded integrally to said slotted skin plate and to said honeycomb core with said plurality of channels underlying said slots; said channels having a variation in depth from a shallow region adjoining the extremities of the respective slots to a substantially deeper region intermediate the extremities of the respective slots; holes in the deepest depth of said channels communicating with channels with duct holes in the underlying honeycomb core; and said channels having stiffening corrugations in the wall thereof formed so that corrugations extend generally transverse to the lengthwise dimension of said channels.

2. A laminate according to claim 1 and further characterized in that said slots in said one skin plate are of zigzag configuration.

References Cited

UNITED STATES PATENTS

| 2,391,997 | 1/1946 | Noble | 52—578 |
| 2,941,759 | 6/1960 | Rice et al. | 161—68 X |
| 2,959,257 | 11/1960 | Campbell | 161—68 |
| 3,020,986 | 2/1962 | Kirk et al. | 161—144 X |
| 3,037,592 | 6/1962 | Shipley et al. | 52—618 |
| 3,104,194 | 9/1963 | Zahorski | 161—68 X |
| 3,196,533 | 7/1965 | Ida et al. | 29—423 X |

EARL M. BERGERT, Primary Examiner

H. F. EPSTEIN, Assistant Examiner

U.S. Cl. X.R.

244—42, 117

UNITED STATES PATENT OFFICE
CERTIFICATE OF CORRECTION

Patent No. 3,516,895          Dated June 23, 1970

Inventor(s) Richard E. Hartman

It is certified that error appears in the above-identified patent and that said Letters Patent are hereby corrected as shown below:

Column 2, line 36, "almuinum" should read -- aluminum --.
Column 6, after line 15, insert

| | | |
|---|---|---|
| 2,833,492 | 5/1958 | Fowler------------244-40 |
| 2,925,231 | 2/1960 | Pfaff, Jr., et al--244-42 |
| 3,070,480 | 12/1962 | Breiner-----------161-68 |
| 3,117,751 | 1/1964 | Rogers, et al------244-42 |
| 3,173,520 | 3/1965 | Fisher------------- 52-309 |
| 3,203,648 | 8/1965 | Vanesian----------244-42 |

Signed and sealed this 3rd day of November 1970.

(SEAL)
Attest:

EDWARD M. FLETCHER, JR.
Attesting Officer

WILLIAM E. SCHUYLER, JR.
Commissioner of Patents